United States Patent [19]

Kramer

[11] 4,103,991
[45] Aug. 1, 1978

[54] OPTICAL SYSTEM FOR SCANNING DURING RECIPROCAL MOTION PROVIDING 180° ROTATION OF IMAGE

[75] Inventor: Charles J. Kramer, Pittsford, N.Y.

[73] Assignee: Xerox Corporation, Stamford, Conn.

[21] Appl. No.: 747,467

[22] Filed: Dec. 3, 1976

[51] Int. Cl.² .................. G03B 27/48; G02B 17/06
[52] U.S. Cl. ........................... 350/297; 355/51; 355/61
[58] Field of Search ............. 350/6, 7, 285, 34, 33, 350/31, 51, 53, 18, 297; 355/66, 65, 51; 358/208

[56] References Cited

U.S. PATENT DOCUMENTS

| 3,532,424 | 10/1970 | Miles ........................... 355/51 |
| 3,574,459 | 4/1971 | Hartwig et al. .............. 350/51 |
| 3,992,093 | 11/1976 | Jakobson ..................... 355/66 |
| 3,994,580 | 11/1976 | Hoffman ...................... 355/66 |
| 4,008,958 | 2/1977 | Kingsland .................... 355/66 |

Primary Examiner—Jon W. Henry

[57] ABSTRACT

An optical system for strip scanning of an object in both directions of relative reciprocal motion between the object and the optical system. The object is first scanned in one direction, then the optical axis between object and image is effectively rotated 180° for scanning in the reverse direction. Properly oriented images are thus projected onto a photoreceptor during both directions of scan.

3 Claims, 1 Drawing Figure

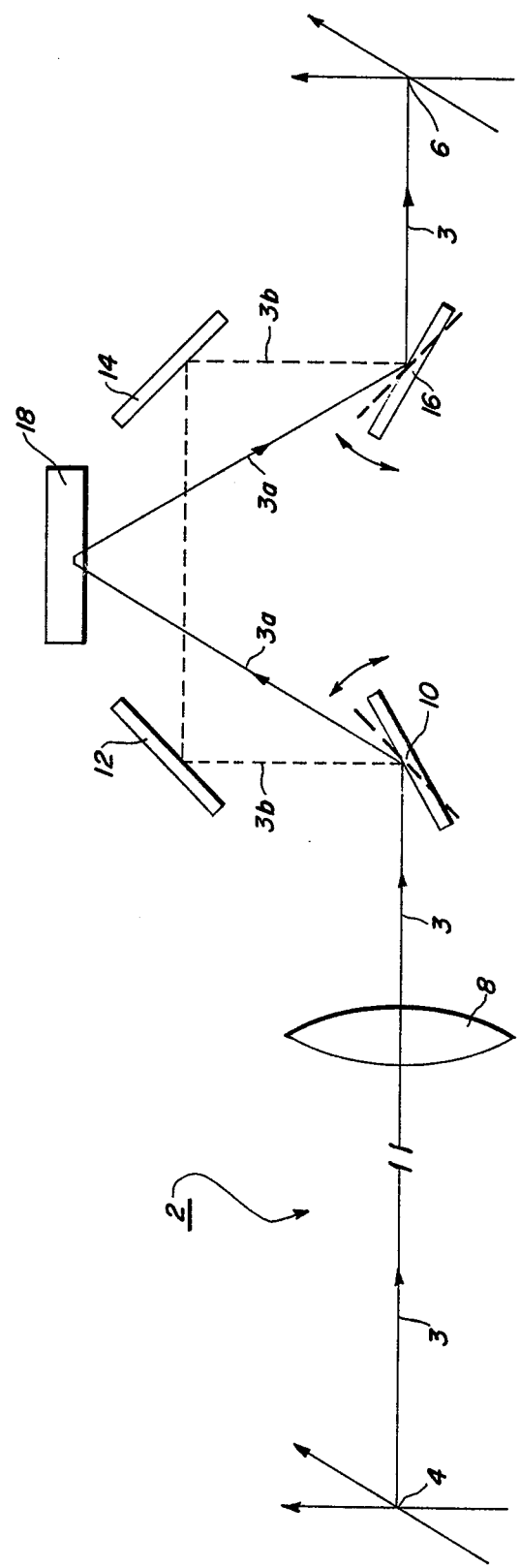

OPTICAL SYSTEM FOR SCANNING DURING RECIPROCAL MOTION PROVIDING 180° ROTATION OF IMAGE

BACKGROUND OF THE INVENTION

This invention relates to optical systems and in particular to a strip scanning optical system for scanning an object and progressively projecting a composite image of the same at an image surface, such as a xerographic or other photosensitive surface in the photocopying process.

There are three general types of strip scanning arrangements known to the prior art. In one, the optical system is fixed and the object and photoreceptor move relative to the optics. In the second, the object is fixed and the optical system and photoreceptor move at appropriate speeds relative to the object. In the third, the object is fixed and is scanned by a rotating mirror to relay an image of the object onto a moving photoreceptor.

Typically, these prior art systems have in common the fact that they are capable of projecting a usable image only in one direction of scan motion. The return motion, whether it be return of the object, the optics, or the mirror, represents lost time in the operation of the system. Accordingly, the prior art has variously resorted to flyback arrangements to minimize the lost time involved in the return motion of the scan mechanism. One system by which to accomplish scanning in both directions of object reciprocation is shown in U.S. Pat. No. 3,574,459 to Hartwig and Schnall, in which a single optical axis is rotated 180° between successive scans by a prism.

SUMMARY OF THE INVENTION

It is an object of the present invention to provide a novel form of strip scanning optical system which is capable of projecting a useful image in an object in both directions of reciprocal scan movement, thus greatly decreasing lost time in the operation of a photocopying apparatus.

Briefly, this invention is practiced in one form by an optical system having alternative optical paths between object and image. One of the paths includes the equivalent of an Abbe prism to invert and revert (i.e. rotate 180°) the propagating image. The alternate path is in effect a shunt path along which the propagating image is upright or unaffected. The two optical paths are used successively, one during each direction of scan movement to project upright ordered images during both directions of scan.

For a better understanding of this invention, reference is made to the following detail description given in connection with the accompanying drawing.

DRAWING

The single drawing FIGURE is an optical diagram of an optical system according to the present invention.

DESCRIPTION

Referring now to the drawing, the optical system of this invention is generally designated by the numeral 2 and is disposed on an optical axis 3 between an object plane 4 and an image plane 6. A projection lens 8 is disposed on the optical axis 3 for projecting an image from the object plane 4 to the image plane 6.

On the image side of the lens 8, a first movable reflector 10 is disposed to deflect the optical axis 3. Reflector 10 is movable between a first position shown in solid lines and a second position represented in phantom lines. In its first positon, reflector 10 deflects the optical axis 3 along a first or "alternate" optical path 3a to a fixed roof reflector 18. The optical path 3a is in turn deflected by the roof reflector 18 to a second movable reflector 16 which, similar to the first, is movable between a first position shown in solid lines and a second positon represented in phantom lines. In its first position, reflector 16 receives light from roof reflector 18 and deflects the alternate optical optical path 3a to the image plane 6.

When movable reflectors 10 and 16 are in their second positions, indicated by the phantom lines, the optical axis 3 is deflected along a second or "shunt" optical path 3b to a first fixed reflector 12, thence to a second fixed reflector 14, and to the second movable reflector 16 from which the optical path 3b is finally deflected to the image plane 6.

In operation, with reflectors 10 and 16 in their first (solid line) positions and alternate optical path 3a in use, the image projected at image plane 6 is in a first or "inverted-reverted" orientation. With reflectors 10 and 16 in their second (phantom line) positions and shunt optical path 3b in use, the image projected at image plane 6 is in a second or "upright" orientation, 180° rotated from the first. To say it another way, the image projected along shunt optical path 6b is unaffected as to orientation and the image projected along alternate optical path 6a is rotated 180° on its axis of propagation.

It is not necessary to an understanding of this invention, but may be pointed out that the image conjugate distances are maintained constant. That is, the system is assembled so that the optical distance from lens to image plane is the same along either the alternate optical path 3a or the shunt optical path 3b.

It will be apparent from the foregoing description that the present system is relatively simple in operation and in terms of economy of motion. The forces involved in the slight tilting of mirrors 10 and 16 and the space required for same are both substantially less than the corresponding factors in the Hartwig and Schnall disclosure.

The foregoing description of an embodiment of this invention is given by way of illustration and not of limitation. The concept and scope of the invention are limited only by the following claims and equivalence thereof which may occur to others skilled in the art.

What is claimed is:

1. An optical system for projecting an image of an object along an optical axis from an object plane to an image plane alternatively along a first alternate optical path and a second shunt optical path, said image being in a first orientation when projected along said first alternate optical path and in a second orientation, rotated 180° about the axis of propagation from said first orientation, when projected along said second shunt optical path, said system including:

a first reflector disposed on said optical axis and arcuately rotatable between a first position to deflect said optical axis along said first alternate optical path and a second position to deflect said optical axis along said second shunt optical path, a second reflector disposed on said optical axis and arcuately rotatable between a first position to deflect said first alternate optical path along said optical axis and a second position to deflect said second shunt optical path along said optical axis, a roof reflector disposed in said first alternate optical path to receive light from said first reflector and deflect the same to said second reflector, said roof reflector having an apex extending in a first direction, first and second fixed reflectors disposed on said second shunt optical path, said first fixed reflector disposed to receive light from said first rotatable reflector when the same is disposed in its second position, said second fixed reflector disposed to receive light from said first fixed reflector and to deflect the same to said second rotatable reflector when said second rotatable reflector is in its second position, said first and second fixed reflectors together forming the equivalent of a roof reflector with an apex extending in a direction perpendicular to said first direction of the apex of said roof reflector in said first alternate optical path.

2. An optical system as defined in claim 1 further including means to synchronously rotate said first and second rotatable reflectors through arcuate displacements between operative positions in said first alternate optical path and said second shunt optical path.

3. An optical system as defined in claim 1 in which said first and second rotatable reflectors are arcuately rotatable about axes orthogonal to said optical axis.

* * * * *